(12) United States Patent
Weese et al.

(10) Patent No.: US 9,684,972 B2
(45) Date of Patent: Jun. 20, 2017

(54) IMAGING APPARATUS FOR IMAGING AN OBJECT

(71) Applicant: KONINKLIJKE PHILIPS N.V., Eindhoven (NL)

(72) Inventors: Juergen Weese, Norderstedt (NL); Irina Wächter-Stehle, Hamburg (DE); Thomas Heiko Stehle, Hamburg (DE); Alex Saalbach, Hamburg (DE); Sabine Mollus, Aachen (DE); Nicole Schadewaldt, Norderstedt (DE); Lyubomir Georgiev Zagorchev, Burlington, MA (US)

(73) Assignee: Koninklijke Philips N.V., Eindhoven (NL)

( * ) Notice: Subject to any disclaimer, the term of this patent is extended or adjusted under 35 U.S.C. 154(b) by 90 days.

(21) Appl. No.: 14/374,585

(22) PCT Filed: Jan. 25, 2013

(86) PCT No.: PCT/IB2013/050652
§ 371 (c)(1),
(2) Date: Jul. 25, 2014

(87) PCT Pub. No.: WO2013/114257
PCT Pub. Date: Aug. 8, 2013

(65) Prior Publication Data
US 2015/0016704 A1    Jan. 15, 2015

Related U.S. Application Data

(60) Provisional application No. 61/594,427, filed on Feb. 3, 2012.

(51) Int. Cl.
*G06K 9/00* (2006.01)
*G06T 7/60* (2017.01)
(Continued)

(52) U.S. Cl.
CPC .................. *G06T 7/60* (2013.01); *G06T 7/33* (2017.01); *G06T 7/73* (2017.01); *G06T 7/75* (2017.01);
(Continued)

(58) Field of Classification Search
CPC .... A61B 6/5247; G06T 7/0046; G06T 7/0024
See application file for complete search history.

(56) References Cited

U.S. PATENT DOCUMENTS

| 5,608,849 A | 3/1997 | King, Jr. | |
|---|---|---|---|
| 6,574,493 B2 * | 6/2003 | Rasche | A61B 6/12 600/407 |

(Continued)

FOREIGN PATENT DOCUMENTS

JP    2011167331 A    9/2011

OTHER PUBLICATIONS

Olivier Ecabert, et al., "Automatic Model-Based Segmentation of the Heart in CT Images", IEEE Transactions on Medical Imaging, vol. 27, No. 9, Sep. 2008, pp. 1189-1201.

(Continued)

*Primary Examiner* — Utpal Shah
*Assistant Examiner* — Ian Lemieux (57) ABSTRACT

An imaging apparatus for imaging an object includes a geometric relation determination unit configured to determine a geometric relation between first and second images of the object. A marker determination unit configured to determine corresponding marker locations in the first and second images and marker appearances based on the geometric relation such that the marker appearances of a first marker to be located at a first location in the first image and of a second marker to be located at a second corresponding location in the second image are indicative of the geometric relation. The images with the markers at the respective (Continued)

corresponding locations are shown on a display unit. Since the marker appearances are indicative of the geometric relation between the images, a comparative reviewing of the images can be facilitated, in particular, if they correspond to different viewing geometries.

17 Claims, 4 Drawing Sheets

(51) Int. Cl.
    *G06T 7/33*     (2017.01)
    *G06T 7/73*     (2017.01)

(52) U.S. Cl.
    CPC ............ *G06T 2207/10121* (2013.01); *G06T 2207/10124* (2013.01); *G06T 2207/10136* (2013.01); *G06T 2207/20101* (2013.01); *G06T 2207/30048* (2013.01); *G06T 2207/30204* (2013.01)

(56) References Cited

U.S. PATENT DOCUMENTS

| | | | | |
|---|---|---|---|---|
| 7,930,014 | B2* | 4/2011 | Huennekens | A61B 6/504 382/159 |
| 7,940,966 | B2 | 5/2011 | Yu et al. | |
| 8,983,577 | B2 | 3/2015 | Hansis | |
| 9,144,394 | B2* | 9/2015 | Cohen | A61B 5/7425 |
| 9,355,448 | B2* | 5/2016 | Shin | A61B 8/5261 |
| 2003/0130576 | A1* | 7/2003 | Seeley | A61B 5/06 600/426 |
| 2005/0281385 | A1* | 12/2005 | Johnson | A61B 6/12 378/163 |
| 2006/0025679 | A1* | 2/2006 | Viswanathan | A61B 34/73 600/424 |
| 2006/0036162 | A1* | 2/2006 | Shahidi | A61B 5/06 600/424 |
| 2006/0079745 | A1* | 4/2006 | Viswanathan | A61B 5/062 600/407 |
| 2007/0016029 | A1 | 1/2007 | Donaldson et al. | |
| 2007/0167801 | A1* | 7/2007 | Webler | G06F 19/3437 600/459 |
| 2010/0063400 | A1 | 3/2010 | Hall et al. | |
| 2010/0094124 | A1* | 4/2010 | Schoonenberg | A61B 5/0084 600/424 |
| 2010/0195878 | A1 | 8/2010 | Vion et al. | |
| 2011/0071395 | A1* | 3/2011 | Miller | A61B 8/0883 600/439 |
| 2011/0282189 | A1* | 11/2011 | Graumann | A61B 6/12 600/427 |
| 2012/0004529 | A1* | 1/2012 | Tolkowsky | A61B 6/5217 600/407 |
| 2013/0184571 | A1* | 7/2013 | Wilkening | A61B 90/39 600/426 |
| 2014/0276001 | A1* | 9/2014 | Ungi | A61B 8/0841 600/424 |
| 2015/0016704 | A1 | 1/2015 | Weese et al. | |

OTHER PUBLICATIONS

Andrew Fitzgibbon, et al., "Direct Least Square Fitting of Ellipses", IEEE Transactions on Pattern Analysis and Machine Intelligence, vol. 21, No. 5, May 1999, pp. 476-480.

G. Gao, et al., "Registration of 3D Trans-Esophageal Echocardiography to X-Ray Fluoroscopy Using Image-Based Probe Tracking", Medical Image Anslysis 16 (2002), pp. 38-49.

A. Jain, et al., 3D TEE Registration With X-Ray Fluoroscopy for Interventional Cardiac Applications, FIMH 2009, LNCS 5528, Springer-Verlag, Berlin, Heidelberg 2009, pp. 321-329.

P. Lang, et al., "Accuracy Assessment of Fluoroscopy-Transesophageal Echocardiography Registration", Medical Imaging 2011: Visualization, Image-Guided Procedures, and Modeling, Proc. of SPIE vol. 7964, pp. 79641-Y-796410-Y.

YL. Ma, et al., "Hybrid Echo and X-Ray Image Guidance for Cardiac Catheterization Procedures by Using a Robotic Arm: a Feasibility Study", Phys. Med. Biol. vol. 55 (2010), pp. N371-N382.

Gao, G. et al., "Rapid Image Registration of Three-Dimensional Transesophageal Echocardiography and X-ray Fluoroscopy for the Guidance of Cardiac Interventions", Conference Information processing in Computer Assisted Interventions, First International Conference, Geneva, 2010, Abstract.

* cited by examiner

IMAGING APPARATUS FOR IMAGING AN OBJECT

CROSS-REFERENCE TO PRIOR APPLICATIONS

This application is the U.S. National Phase application under 35 U.S.C. §371 of International Application Serial No. PCT/IB2013/050,652, filed on Jan. 25,2013, which claims the benefit of U.S. application Ser. No. 61/594,427, filed on Feb. 3, 2012. These applications are hereby incorporated by reference herein.

FIELD OF THE INVENTION

The invention relates to an imaging apparatus, an imaging method and an imaging computer program for imaging an object.

BACKGROUND OF THE INVENTION

In cardiac interventions such as mitral valve repair, aortic valve repair or the closure of septal defects, three-dimensional transesophageal echo (TEE) volume imaging is used together with two-dimensional x-ray projection imaging because different structures are visible in the resulting three-dimensional TEE volume image and two-dimensional x-ray projection image. The three-dimensional TEE volume image and the two-dimensional x-ray projection image, which are visualized side-by-side on a display unit, often correspond to different viewing geometries, which makes a comparison of the two different images difficult.

SUMMARY OF THE INVENTION

It is an object of the present invention to provide an imaging apparatus, an imaging method and an imaging computer program for imaging an object, wherein a visualization of two different images of the object, which may correspond to different viewing geometries, can be improved such that a comparison of the two different images can be facilitated.

In a first aspect of the present invention an imaging apparatus for imaging an object is presented, wherein the imaging apparatus comprises:
 a first image providing unit for providing a first image of the object,
 a second image providing unit for a providing a second image of the object,
 a geometric relation determination unit for determining a geometric relation between the first image and the second image,
 a marker determination unit for determining corresponding marker locations in the first and second images and marker appearances based on the geometric relation such that a first location in the first image and a second location in the second image show the same part of the object and such that the marker appearances of a first marker to be located at the first location and of a second marker to be located at the second location are indicative of the geometric relation between the first image and the second image,
 a display unit for showing the first image with the first marker at the first location and the second image with the second marker at the second location.

Since the geometric relation determination unit determines a geometric relation between the first image and the second image, since the marker determination unit determines corresponding marker locations in the first and second images and marker appearances based on the geometric relation such that a first location in the first image and a second location in the second image show the same part of the object and such that the marker appearances of a first marker to be located at the first location and of a second marker to be located at the second location are indicative of the geometric relation between the first image and the second image and since the display unit shows the first image with the first marker at the first location and the second image with the second marker at the second location, the geometric relation between the different images can be indicated by the first and second markers, thereby facilitating a comparison of the different images, in particular, if they correspond to different viewing geometries.

The first image providing unit can be a first imaging system for acquiring and providing the first image and the second image providing unit can be a second imaging system for acquiring and providing the second image. The first image providing unit and/or the second image providing unit can also be a storing unit, in which the respective image is stored already and from which the respective image can be retrieved for providing the same. For instance, one of the first image providing unit and the second image providing unit can be a storing unit in which a pre-interventional image of the object is stored and from which the pre-interventional image can be provided as the first image or the second image. The other of the first image providing unit and the second image providing unit can be an imaging system for acquiring an actual image of the object, in particular, of a person, in order to allow a user like a physician to compare the pre-interventional image with the actual image of the object. In this case the actual image can be, for instance, a two-dimensional x-ray projection image or a three-dimensional volume image like a three-dimensional volume ultrasound, computed tomography or magnetic resonance image. The first image providing unit and the second image providing unit can also be any other unit being adapted to provide a first image and a second image, respectively. For instance, the first image providing unit and/or the second image providing unit can be a receiving unit for receiving the first image and/or the second image, respectively, via a wired or wireless data connection, wherein the first image providing unit and/or the second image providing unit can be adapted to provide the received respective image. Moreover, the first image providing unit and/or the second image providing unit can be a picture archiving and communication system (PACS) for providing the first image and/or the second image, respectively.

The first image providing unit and the second image providing unit can also be an integrated unit providing both, the first image of the object and the second image of the object. For instance, the integrated image providing unit can be an x-ray C-arm system, which can be used for providing a two-dimensional x-ray projection image as one of the first and second images and for providing a computed tomography image as the other of the first and second images, wherein the computed tomography image can be reconstructed from two-dimensional x-ray projection images acquired in different acquisition directions by the x-ray C-arm system.

The geometric relation defines how each image point of the first image is geometrically related to the image points of the second image or vice versa. For instance, if the first image is a three-dimensional volume image of the object and the second image is a two-dimensional projection image of the object generated by detecting rays having traversed the object, the geometric relation defines which image points of the first three-dimensional volume image correspond to which image point of the two-dimensional projection image by defining which image points of the three-dimensional volume image correspond to the parts of the object, which have to be traversed by a ray for generating the respective image point of the two-dimensional projection image.

The marker appearances are preferentially three-dimensional appearances, i.e. the first and second markers preferentially generate a three-dimensional user impression, in order to indicate the geometric relation between the first and second images.

It is preferred that the marker determination unit is adapted such that the first marker represents a spatially two-dimensional or three-dimensional graphical element in a first orientation within the first image, thereby defining the appearance of the first marker, and the second marker represents the spatially two-dimensional or three-dimensional graphical element in a second orientation within the second image, thereby defining the appearance of the second marker, wherein the first orientation and the second orientation of the spatially two-dimensional or three-dimensional graphical element differ from each other in accordance with the geometric relation between the first image and the second image such that the appearances of the first and second markers are indicative of the geometric relation between the first image and the second image. For example, the spatially two-dimensional or three-dimensional element can be a ring or an ellipse. This allows a user like a physician to intuitively recognize the geometric relation between the first and second images by just comparing the first and second markers.

It is further preferred that the first image is an image acquired by a first imaging system and the second image is an image acquired by a second imaging system, wherein the imaging apparatus further comprises a localization unit for localizing the first imaging system with respect to the second imaging system, wherein the geometric relation determination unit is adapted to calculate the geometric relation between the first image and the second image based on the localization of the first imaging system with respect to the second imaging system. The localization unit is preferentially one of an electromagnetic based, optical shape sensing based and image based localization unit. This allows determining the geometric relation between the first and second images relatively accurately.

In a preferred embodiment, one of the first imaging system and the second imaging system is a three-dimensional volume imaging system for acquiring a three-dimensional volume image and the other of the first imaging system and the second imaging system is a two-dimensional projection imaging system for acquiring a two-dimensional projection image, wherein the localization unit is adapted to localize the three-dimensional volume imaging system with respect to the projection imaging system and wherein the geometric relation determination unit is adapted to determine the geometric relation between the three-dimensional volume image and the two-dimensional projection image based on the localization of the three-dimensional volume imaging system with respect to the two-dimensional projection imaging system. The three-dimensional volume imaging system is preferentially an ultrasound imaging system like a three-dimensional TEE imaging system. The two-dimensional projection imaging system is preferentially an x-ray projection system like an x-ray C-arm system.

The two-dimensional projection image is acquired in a projection acquisition geometry, wherein the geometric relation determination unit can be adapted to determine the geometric relation between the three-dimensional volume image and the two-dimensional projection image based on the localization of the first imaging system with respect to the second imaging system and the projection acquisition geometry. For instance, if the projection imaging system comprises a radiation source and a radiation detector, the positions of the radiation source and the radiation detector, i.e. the run of the rays being used for generating the two-dimensional projection image, relative to the object in the orientation shown in the three-dimensional volume image can be determined based on the localization of the first imaging system with respect to the second imaging system and the projection acquisition geometry, thereby defining the geometric relation between the three-dimensional image and the two-dimensional projection image. This allows determining the geometric relation between the first and second images very accurately.

It is also preferred that the imaging apparatus comprises an input unit for allowing a user to input the first location in the first image for providing the first location, wherein the marker determination unit is adapted to determine the second location in the second image based on the provided first location in the first image and the provided geometric relation between the first image and the second image. Moreover, the input unit can be adapted to allow a user to input a first marker to be located at the first location within the first image, wherein the marker determination unit is adapted to determine the second marker based on the input first marker and the provided geometric relation between the first image and the second image such that the marker appearance of the second marker with respect to the marker appearance of the first marker is indicative of the geometric relation between the first image and the second image.

The input unit can be a graphical user interface allowing a user to select a desired graphical element from a predefined set of graphical elements, wherein the selected graphical element is arranged at the first location within the first image as the first marker, wherein the arranged graphical element defines the marker appearance of the first marker. The marker determination unit can then determine the orientation of the graphical element at the second location within the second image in accordance with the geometric relation between the first image and the second image, wherein the graphical element in this determined orientation can be shown in the second image as the second marker and defines the marker appearance of the second marker.

In a preferred embodiment the imaging apparatus comprises a) an object model providing unit for providing an object model representing structures of the object, wherein to at least one structure a graphical element representing the structure is assigned, and b) a model adaptation unit for adapting the object model to the first image, wherein the marker determination unit is adapted to determine the first location of the first marker within the first image as being the location of the at least one structure of the adapted object model, wherein the graphical element assigned to the at least one structure defines the marker appearance of the first marker, and to determine the second location and the marker appearance of the second marker by determining the location and orientation of the graphical element within the second image based on the geometric relation between the first image and the second image. The marker determination unit can be adapted to orient the graphical element to the at least one structure at the first location within the first image by using predefined landmarks detectable in the first image at the first location. Thus, in this embodiment the first location of the first marker and the marker appearance of the first marker can be automatically determined by using the object model representing structures of the object. If several graphical elements are assigned to several structures of the object model, a user may choose the graphical elements and, thus, corresponding object structures to be marked by using an input unit.

In an embodiment, the first image is a three-dimensional volume image like a three-dimensional volume ultrasound image, wherein the object model can be adapted to the three-dimensional volume image by translating, rotating and/or deforming the object model. In particular, a model-based segmentation can be performed as disclosed in the article "Automatic Model-based Segmentation of the Heart in CT Images" by O. Ecabert et al., IEEE Transactions on Medical Imaging, 27(9), 1189-1201 (2008), which is herewith incorporated by reference. By adapting the object model to the three-dimensional volume image also the at least one structure and, thus, the graphical element can be adapted to the three-dimensional volume image, thereby defining the location and orientation of the graphical element within the first image, which in turn define the location and marker appearance of the first marker within the first image. The location and the orientation of the graphical element can be transformed into the second image, which may be, for example, a two-dimensional projection image, by using the provided geometric relation between the first image and the second image, thereby defining the second location and marker appearance of the second marker.

The graphical element representing the structure can be the structure itself or a graphical primitive, i.e. a simplified graphical element representing the structure like an ellipse or a ring optionally with an element on the ellipse or the ring for indicating the rotational position of the ellipse or ring, respectively. The orientation and dimensions of the simplified graphical element within the first image can be determined by using landmarks detectable in the first image.

The object model is preferentially a heart model showing anatomical heart structures. Preferentially, to the at least one structure to which the graphical element is assigned also an annotation is assigned, wherein the display unit is adapted to display also the annotation assigned to the at least one structure. Thus, not only marker locations and marker appearances can be determined, but also an annotation describing the respective marker can be automatically determined and displayed on the display unit.

In a further preferred embodiment the model adaptation unit is adapted to adapt the object model to the first image and to the second image, wherein the geometric relation determination unit is adapted to determine the geometric relation between the first image and the second image based on the adaptations of the object model to the first image and to the second image. In particular, the model adaptation unit can be adapted to adapt the object model to one of the first image and the second image and to rigidly adapt the adapted object model to the other of the first image and the second image, wherein the geometric relation determination unit can be adapted to determine the geometric relation based on the rigid adaptation of the adapted object model.

The object model may be a personalized object model. The personalized object model may be generated from a three-dimensional volume computed tomography or magnetic resonance image by adapting a generic object model using, for instance, model based segmentation as described in the above mentioned article by O. Ecabert et al. The personalized object model may be adapted to a two-dimensional projection image of a two-dimensional projection imaging system being used for providing one of the first and second images by registering the personalized object model to the two-dimensional projection image. This registration procedure may include a translation and/or rotation of the personalized object model only and may be performed once at the beginning of the imaging procedure. The other of the first and second images may be a three-dimensional volume image, wherein the personalized object model may be rigidly matched to the three-dimensional volume image. The geometric relation can then be defined by the transformations for adapting the personalized object model to the two-dimensional projection image and the three-dimensional volume image. Thus, in an embodiment the geometric relation between the first and second images can be determined without using a localization unit like an electromagnetic based, optical shape sensing based or image based localization unit, thereby allowing to provide an imaging apparatus being technically less complex.

The first image and the second image can also be temporal images showing a moving object like the heart of a living being. For example, the first image can be a four-dimensional image of the heart with three spatial dimensions and one temporal dimension and the second image can be a three-dimensional image of the heart with two spatial dimensions and one temporal dimension such that the first and second markers can be continuously shown overlaid in the first and second images, respectively, while the movement of the object is shown.

In a further aspect of the present invention an imaging method for imaging an object is presented, wherein the imaging method comprises:

providing a first image of the object by a first image providing unit, providing a second image of the object by a second image providing unit, determining a geometric relation between the first image and the second image by a geometric relation determination unit, determining corresponding marker locations in the first and second images and marker appearances based on the geometric relation by a marker determination unit such that a first location in the first image and a second location in the second image show the same part of the object and such that the marker appearances of a first marker to be located at the first location and of a second marker to be located at the second location are indicative of the geometric relation between the first image and the second image, showing the first image with the first marker at the first location and the second image with the second marker at the second location by a display unit.

In a further aspect of the present invention an imaging computer program for imaging an object is presented, wherein the imaging computer program comprises program code means for causing an imaging apparatus to carry out the steps of the imaging method, when the imaging computer program is run on a computer controlling the imaging apparatus.

It shall be understood that the imaging apparatus, the imaging method and the imaging computer program have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
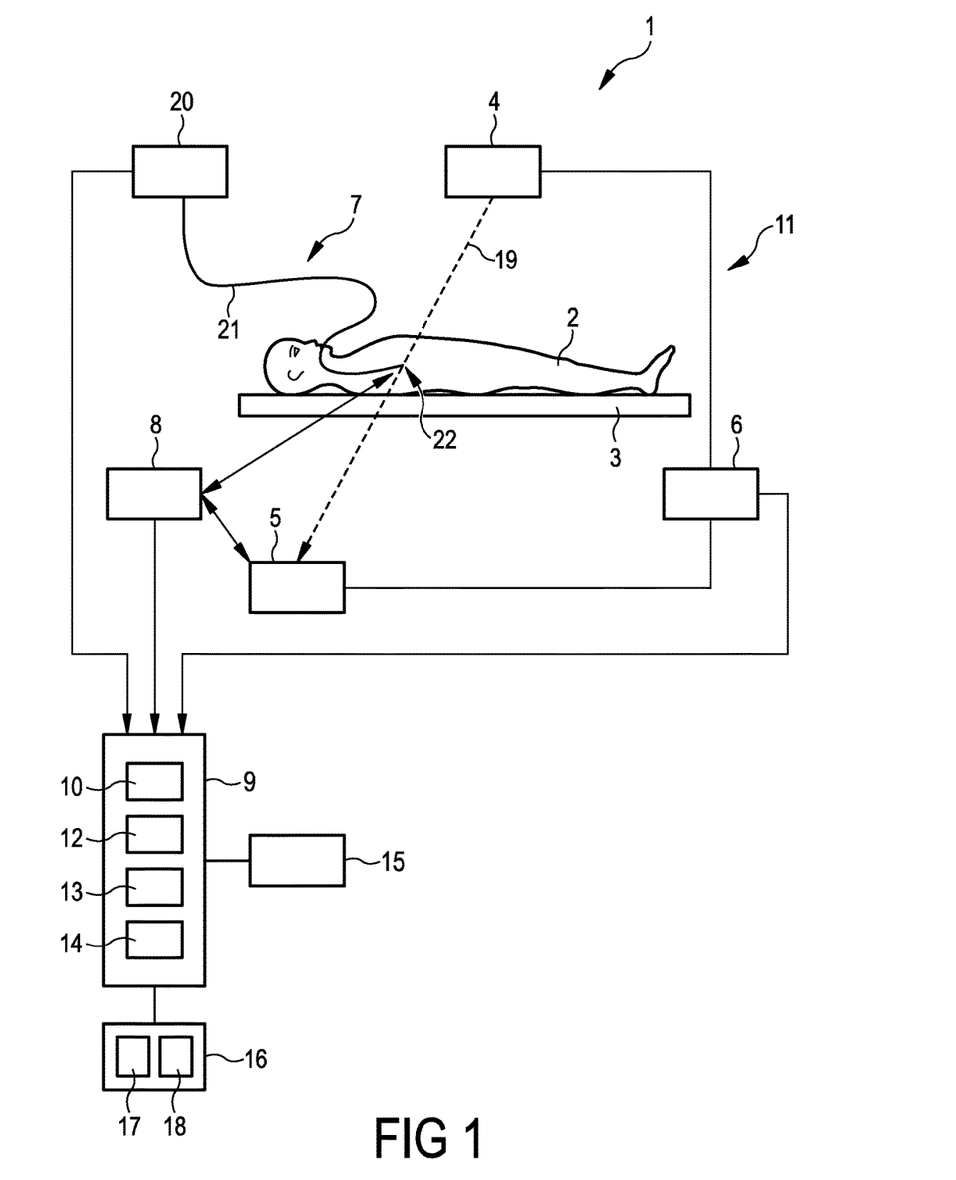
FIG. 1 shows schematically and exemplarily an embodiment of an imaging apparatus for imaging an object.

FIG. 1 shows schematically and exemplarily an imaging apparatus 1 for imaging an object. In this embodiment, the object is a heart of a person 2 lying on a table 3. The imaging apparatus 1 comprises a first image providing unit 7 for providing a first image of the heart, a second image providing unit 11 for providing a second image of the heart, and a processing device 9 including a geometric relation determination unit 10 for determining a geometric relation between the first image and the second image. The processing device 9 further comprises a marker determination unit 14 for determining corresponding marker locations in the first and second images and marker appearances based on the geometric relation such that a first location in the first image and a second location in the second image show the same part of the heart and such that the marker appearances of a first marker to be located at the first location and of a second marker to be located at the second location are indicative of the geometric relation between the first image and the second image. The imaging apparatus 1 further comprises a display unit 16 for showing the first image with the first marker at the first location and the second image with the second marker at the second location.

In this embodiment the first imaging system is a three-dimensional volume imaging system 7, in particular, a three-dimensional ultrasound TEE imaging system. The three-dimensional volume imaging system 7 acquires a three-dimensional volume image of the heart as the first image. The three-dimensional volume imaging system 7 comprises an introductory element 21 with ultrasound transducers at the tip 22 of the introductory element 21, wherein the introductory element 21 is adapted to be introduced into the esophagus of the person 2, in order to perform a three-dimensional TEE imaging. The three-dimensional volume imaging system 7 is controlled by a control unit 20, wherein the control unit 20 provides the acquired three-dimensional volume ultrasound image of the heart to the processing device 9.

The second imaging system 11 is a two-dimensional projection imaging system for acquiring a two-dimensional projection image as the second image. In this embodiment, the two-dimensional projection imaging system 11 is an x-ray C-arm system comprising an x-ray source 4 and an x-ray detector 5. The x-ray source 4 emits x-rays 19 traversing the heart within the person 2, wherein the x-rays 19 are detected by the x-ray detector 5 after they have traversed the heart within the person 2. The x-ray source 4 and the x-ray detector 5 of the x-ray C-arm system 11 are controlled by a control unit 6. The two-dimensional x-ray projection images detected by the x-ray detector 5 are provided to the processing device 9.

The imaging apparatus 1 further comprises a localization unit 8 for localizing the three-dimensional volume imaging system 7 with respect to the two-dimensional projection imaging system 11. In this embodiment the localization unit 8 is an electromagnetic based localization unit. However, the localization unit can also be based on another known localization technique like an optical shape sensing based localization technique or an image based localization technique.

The localization unit 8 is preferentially adapted to determine the position of the three-dimensional volume imaging system 7 and the two-dimensional projection system 11 with respect to each other, in order to register these two imaging systems with respect to each other. In other embodiments, the localization unit can be attached to one of the imaging systems such that the position of the localization unit with respect to this imaging system is fixed and known, wherein in this case the localization unit can be adapted to localize only the other imaging system for registering the two imaging systems, i.e. to determine the spatial relation between the two imaging systems.

The geometric relation determination unit 10 is adapted to determine the geometric relation between the three-dimensional volume image and the two-dimensional production image based on the localization of the three-dimensional volume imaging system 7 with respect to the two-dimensional projection imaging system 11 and based on the projection acquisition geometry in which the respective two-dimensional projection image is acquired. For instance, the positions of the x-ray source 4 and the x-ray source detector 5, i.e. the run of the rays being used for generating the two-dimensional projection image, relative to the heart in the orientation shown in the three-dimensional volume image can be determined based on the localization of the three-dimensional volume imaging system 7 with respect to the two-dimensional projection imaging system 11 and the projection acquisition geometry, thereby defining the geometric relation between the three-dimensional volume image acquired by the three-dimensional volume imaging system 7 and the two-dimensional projection image acquired by the two-dimensional projection imaging system 11. The projection acquisition geometry can be provided by the control unit 6 of the two-dimensional projection imaging system 11, or by the localization unit 8, if the localization unit 8 is adapted to, for instance, determine the position of the x-ray source 4 or the x-ray detector 5 and if the spatial relation between the x-ray source 4 and the x-ray detector 5 is fixed and known. Also if the localization unit 8 is attached to the x-ray source 4 or the x-ray detector 5 and adapted to determine the position of the tip 22 of the introductory element 21 of the three-dimensional volume imaging system 7, and if the spatial relation between the x-ray source 4 and the x-ray detector 5 is fixed and known, the localization unit 8 can provide the projection acquisition geometry. The localization unit 8 is adapted to provide the localization results to the processing device 9.

The imaging apparatus 1 further comprises an input unit 15 for allowing a user to input the first location in the first image for providing the first location, wherein the marker determination unit 14 can be adapted to determine the second location in the second image based on the provided first location in the first image and the provided geometric relation between the first image and the second image. Moreover, the input unit 15 can be adapted to allow a user to input a first marker to be located at the first location within the first image, wherein the marker determination unit 14 can be adapted to determine the second marker based on the input first marker and the provided geometric relation between the first image and the second image such that the marker appearance of the second marker with respect to the marker appearance of the first marker is indicative of the geometric relation between the first image and the second image. In this embodiment, the input unit 15 is a keyboard, a mouse, a touchpad or another unit allowing a person to input information into a processing device, wherein the input unit 15 is adapted to cooperate with a graphical user interface allowing a user to select a desired graphical element from a predefined set of graphical elements and to position and orient this graphical element within the three-dimensional volume image as desired. The marker determination unit 14 can then determine the position and the orientation of this graphical element within the two-dimensional projection image by using the geometric relation between the first and second image.

Figure 2:
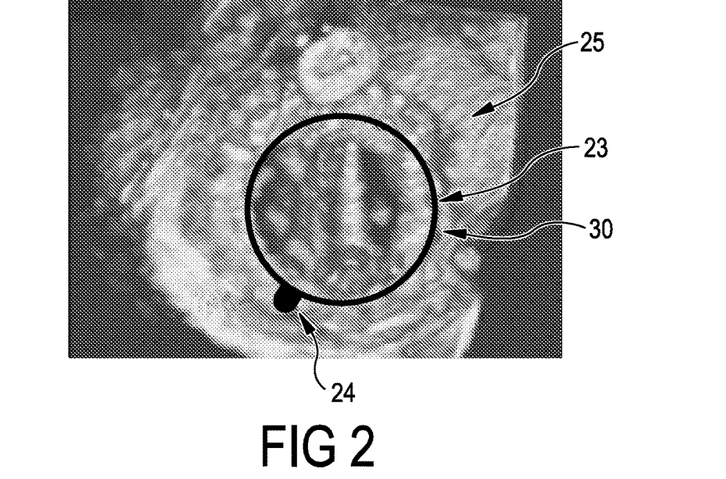
FIG. 2 shows schematically and exemplarily a first image of a heart acquired by a three-dimensional volume imaging system.
Figure 3:
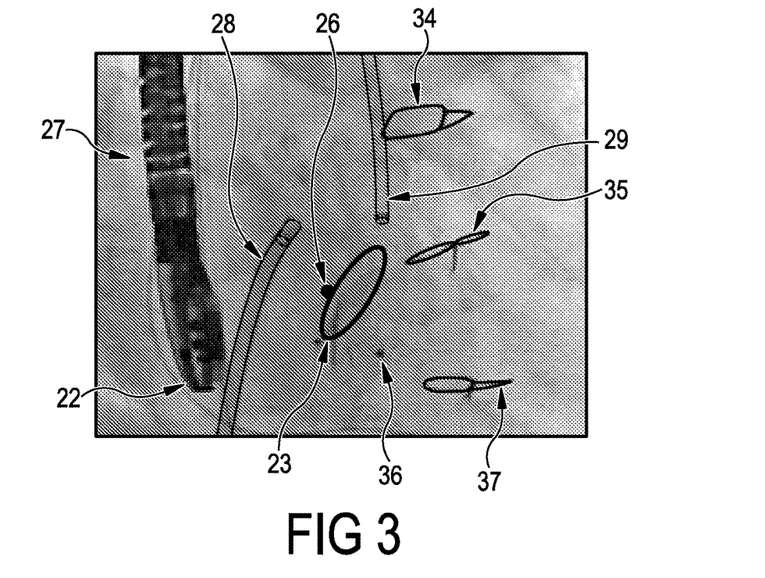
FIG. 3 shows schematically and exemplarily a second image of the heart acquired by a two-dimensional projection imaging system.

The graphical element, which can be selected by the user, can be, for instance, a ring 23 having an element 24 for indicating the rotational position of the ring 23 as schematically and exemplarily shown in FIG. 2. The selected ring 23 can be positioned and optionally the shape can be amended, for instance, the diameter can be modified, in the three-dimensional volume image 25 as desired, thereby providing the first marker 30. In this example, the graphical element 23 has been overlaid over the first image 25 by the user to indicate a corresponding cardiac structure being, in this example, the mitral valve. Since after the graphical element 23 has been positioned and oriented as desired within the first image the position and orientation of the graphical element 23 within the heart is known and since also the geometric relation between the first and second images, in particular, the projection acquisition geometry, which has been used for acquiring the second image, is known, the marker determination unit 14 can simulate the projection procedure, thereby virtually projecting the graphical element onto a two-dimensional detection surface of the x-ray detector 5. The resulting second marker 26 having an elliptical marker appearance within the second image 27 being a two-dimensional x-ray projection image is schematically and exemplarily shown in FIG. 3. FIG. 3 further shows exemplarily the tip 22 of the introductory element 21, a transseptal sheath 28, a delivery system 29, and further elements 34, 35, 36 and 37, which can be used during a catheterization procedure like an intervention for treating paravalvular leakage with an Amplatzer Vascular Plug III device from the company AGA Medical Corporation after mechanical mitral valve replacement.

The marker determination unit 14 is therefore adapted such that the first marker 30 represents a graphical element 23 in a first orientation, thereby defining the marker appearance of the first marker 30, and the second marker 26 represents the graphical element 23 in a second orientation, thereby defining the marker appearance of the second marker 26, wherein the first orientation and the second orientation of the graphical element 23 differ from each other in accordance with the geometric relation between the three-dimensional volume image 27 and the two-dimensional projection image 25.

The processing device 9 further comprises an object model providing unit 12 for providing an object model representing structures of the object, wherein to at least one structure a graphical element representing the structure is assigned. In this embodiment, the object model is a heart model representing cardiac structures. Such a heart model 31 is schematically and exemplarily shown in FIG. 4.

Figure 4:
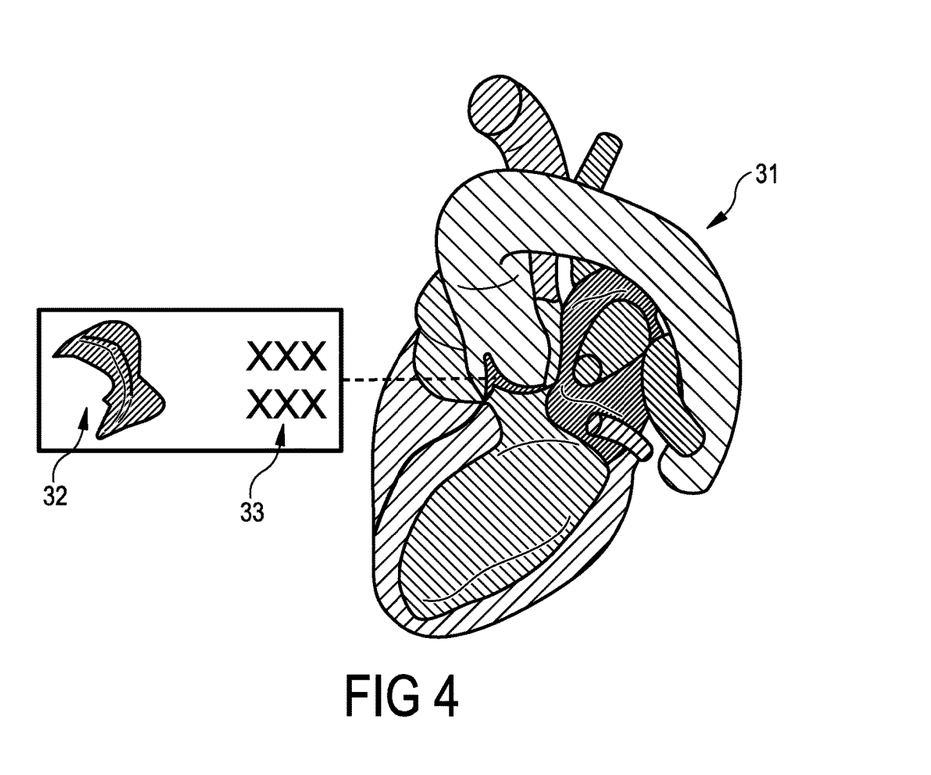
FIG. 4 shows schematically and exemplarily a heart model with a graphical element and an annotation.

The heart model 31 comprises different cardiac structures which may be encoded by different colors, wherein the different colors are indicated in FIG. 4 by different shadings. To at least one cardiac structure a graphical element representing the cardiac structure is assigned. In this embodiment, to the cardiac structure representing the aortic valve the graphical element 32 and additionally an annotation 33 has been assigned. The annotation 33 indicates the name of the cardiac structure, i.e. in this embodiment the annotation 33 indicates the name "aortic valve".

The processing device 9 further comprises a model adaptation unit 13 for adapting the heart model 31 to the three-dimensional volume image. The marker determination unit 14 can be adapted to use the adapted object model for determining the first marker. In particular, the marker determination unit 14 can be adapted to determine the first location of the first marker within the three-dimensional volume image as being the location of the at least one structure of the adapted object model, wherein the graphical element 32 assigned to the at least one structure defines the marker appearance of the first marker. Moreover, the marker determination unit 14 can be adapted to determine the second location and the marker appearance of the second marker by determining the location and orientation of the graphical element within the second image based on the geometric relation between the first image, i.e. the three-dimensional volume image, and the second image, i.e. the two-dimensional projection image. In particular, the heart model 31 can be adapted to the three-dimensional volume image by translating, rotating and/or deforming the heart model. For instance, a model-based segmentation can be performed as disclosed in the above mentioned article by O. Ecabert et al. By adapting the object model to the three-dimensional volume image also the at least one structure and, thus, the graphical element is adapted to the three-dimensional volume image, thereby defining the location and orientation of the graphical element 32 within the three-dimensional volume image, which in turn defines the location and marker appearance of the first marker within the first image. The location and the orientation of the graphical element 32 can be transformed into the two-dimensional projection image by using the provided geometric relation between the three-dimensional volume image and the two-dimensional projection image including the projection acquisition geometry used while acquiring the two-dimensional projection image, thereby defining the second location and marker appearance of the second marker.

The graphical element 32 can be the respective cardiac structure itself, i.e. it can have the shape of the aortic valve in this embodiment, or the graphical element can be a graphical primitive, i.e. a simplified graphical element representing the structure like an ellipse or a ring optionally with an element on the ellipse or the ring, respectively, for indicating the rotational position of the ellipse or the ring, respectively, like the ring 23 schematically and exemplarily shown in FIGS. 2 and 3. The orientation and dimensions of the graphical element, in particular, of the simplified graphical element, within the three-dimensional volume image can be determined by adapting the respective graphical element to predefined marks on the adapted object model. This adaptation of the graphical element to the predefined marks of the adapted object model can be, for instance, a least-square adaptation. The predefined marks on the adapted object model, to which the graphical element is adapted, are, for instance, certain object model points or object model segments like triangles. In another embodiment the orientation and dimensions of the graphical element within the three-dimensional volume image may also be determined by using landmarks detectable in the three-dimensional volume image.

The display unit 16 comprises a first viewport 17 for displaying the first image with the first marker at the first location and a second viewport 18 for displaying the second image with the second marker at the second location. The display unit 16 is further adapted to display an annotation. The annotation is preferentially the name of the cardiac structure at which the respective marker is located, wherein the annotation can be input by a user or can be determined automatically by using the above described heart model 31 comprising at least one structure to which a graphical element 32 and an annotation 33 is assigned.

The geometric relation determination unit 10 can also be adapted to determine the geometric relation without using the localization unit 8. The localization unit 8 is therefore optional. In particular, the geometric relation can be determined based on adapting a heart model to the first image and the second image, i.e. the model adaptation unit 13 can be adapted to adapt the heart model to the first image and to the second image, wherein the geometric relation determination unit 10 can be adapted to determine the geometric relation based on the adaptations of the heart model to the first image and to the second image. For instance, the model adaptation unit 13 can be adapted to adapt the heart model to one of the first image and the second image and to rigidly adapt the adapted heart model to the other of the first image and the second image, wherein the geometric relation determination unit 10 is adapted to determine the geometric relation based on the rigid adaptation of the adapted heart model. The geometric relation determination unit 10 can also be adapted to use other image-based registration techniques for determining the geometric relation between the first and second images. For instance, the position of the tip 22 of the introductory element 21 of the three-dimensional volume imaging system 7 can be determined with respect to the x-ray projection imaging system 11 by positioning a model of the tip of the introductory element such that a simulation of the acquisition of the two-dimensional x-ray projection images leads to simulated projection images of the tip of the introductory element, which are similar to actually measured projection images of the tip of the introductory element. In particular, the image-based registration can be a two-dimensional/three-dimensional registration as disclosed in the article "Registration of 3D Trans-esophageal Echocardiography to X-ray Fluoroscopy using Image-based Probe Tracking" by Gang Gao et al., Medical Image Analysis, volume 16, issue 1, pages 38 to 49 (2012), which is herewith incorporated by reference.

In an embodiment, the heart model is a personalized heart model. The personalized heart model may be generated from a three-dimensional volume computed tomography or magnetic resonance image by adapting a generic heart model using, for instance, the model based segmentation technique described in the above mentioned article by O. Ecabert et al. The personalized heart model may be adapted to a two-dimensional projection image of the two-dimensional projection imaging system by registering the personalized heart model to the two-dimensional projection image. This registration procedure may include a translation and/or rotation of the personalized heart model only and may be performed once at the beginning of the imaging procedure. The personalized heart model may then be rigidly matched to the three-dimensional volume image. The geometric relation determination unit 10 can then be adapted to determine the geometric relation based on the transformations for adapting the personalized heart model to the two-dimensional projection image and the three-dimensional volume image.

Figure 5:
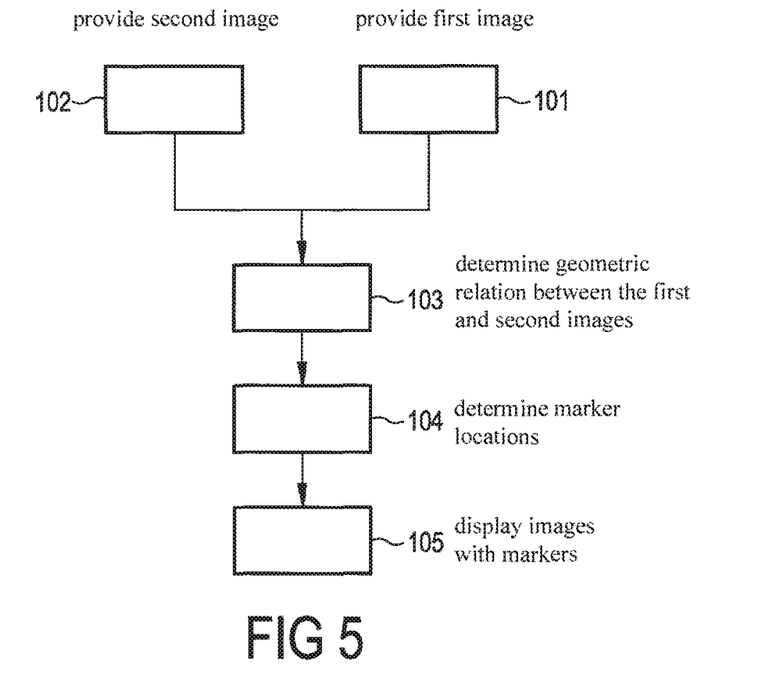
FIG. 5 shows a flowchart exemplarily illustrating an embodiment of an imaging method for imaging an object.

In the following an embodiment of an imaging method for imaging an object will exemplarily be described with reference to a flowchart shown in FIG. 5.

In step 101, a first image of an object is provided by a first image providing unit. In this embodiment, a three-dimensional volume image of the heart of a person is acquired by a three-dimensional TEE volume imaging system. In step 102, a second image of the object is provided by a second image providing unit, i.e. in this embodiment an x-ray projection imaging system acquires a two-dimensional projection image of the heart of the person. In step 103, a geometric relation between the first image and the second image is determined by a geometric relation determination unit. For instance, localization information from a localization unit like an electromagnetic based localization unit can be used by the geometric relation determination unit for determining the geometric relation between the first image and the second image. Alternatively, an object model, i.e. in this embodiment a heart model, can be registered to the first image and to the second image, wherein the resulting registration transformations define the geometric relation between the first and second images and can therefore be used by the geometric relation determination unit for determining the geometric relation between the two images. In step 104, corresponding marker locations in the first and second images and marker appearances are determined based on the geometric relation by a marker determination unit such that a first location in the first image and a second location in the second image show the same part of the object and such that the marker appearances of a first marker to be located at the first location and of a second marker to be located at the second location are indicative of the geometric relation between the first image and the second image. In step 105, the first image with the first marker at the first location and the second image with the second marker at the second location are shown by a display unit.

The first image and the second image can also be temporal images showing a moving object like the heart of a living being. For example, the first image can be a four-dimensional image of the heart with three spatial dimensions and one temporal dimension, i.e. the first image can comprise a sequence of spatially three-dimensional frames. The second image can be a three-dimensional image of the heart with two spatial dimensions and one temporal dimension, i.e. the second image can comprise spatially two-dimensional frames showing two-dimensional projection images at different times. The first and second markers can continuously be shown overlaid on the first and second images, respectively, while the movement of the object is shown. For instance, a spatially three-dimensional frame and a spatially two-dimensional frame, which correspond to the same time, can be used for determining corresponding markers in these two frames, wherein this determination of markers can be performed for different times, in order to determine temporarily dependent corresponding markers in the first and second images.

The imaging apparatus described above with reference to FIGS. 1 to 3 can be adapted to be used in a catheterization laboratory for imaging a heart of a living being during a catheterization procedure. For instance, the imaging apparatus can be adapted to be used during interventional procedures like a mitral valve repair, an aortic valve repair or the closure of septal defects. In particular, using three-dimensional TEE imaging together with two-dimensional x-ray projection imaging can be helpful during such interventional procedures, because of the different structures being visible in the different images. The imaging apparatus displays the two-dimensional x-ray projection image and the three-dimensional TEE volume image in a way that cardiologists, cardiac surgeons and other personnel present during such an intervention can easily understand and interpret the different images, even if the different images require different, anatomically not corresponding viewing geometries as generally the case during such an interventional procedure.

The imaging apparatus described above with reference to FIGS. 1 to 3 is preferentially adapted to generate markers for anatomical structures and corresponding anatomical annotations and to overlay at least the markers onto the two-dimensional x-ray projection image and the three-dimensional TEE volume image during an intervention. The markers preferentially have three-dimensional properties associated, i.e. marker appearances, that help to understand their relative orientation in both images as exemplarily shown in FIGS. 2 and 3. The geometric relation between the two-dimensional x-ray projection image and the three-dimensional TEE volume image required for this purpose can be generated, for instance, by electromagnetic based, optical shape sensing based or image based localization of the TEE probe in a catheterization laboratory coordinate system, in which the projection acquisition geometry used for acquiring the two-dimensional x-ray projection images is known. The markers and the optional annotations may be generated semi-automatically or completely automatically, wherein in the latter case a model based segmentation of the heart shown in the three-dimensional volume image may be performed.

The imaging apparatus described above with reference to FIGS. 1 to 3 is preferentially adapted to indicate a corresponding structure like a mitral valve in a two-dimensional x-ray projection image and in a three-dimensional TEE volume image displayed in different viewing geometries, wherein the transformation required for a correct overlay at corresponding positions can be generated by the geometric relation determination unit by using the result of a localization procedure performed by the localization unit or by using a registration of a personalized heart model to two-dimensional x-ray projection images as described above. Moreover, the registration of the personalized heart model to the two-dimensional x-ray projection images can be performed as done in the products EP Navigator and Heart Navigator from the company Philips, wherein the personalized heart model can be manually translated and rotated by a user, wherein two-dimensional projection images showing the contours of the translated and rotated personalized heart model according to the x-ray imaging system geometry are simulated, wherein the simulated projection images are overlaid over actually measured projection images and wherein the user translates and rotates the personalized heart model such that the overlaid simulated and actually measured projection images match each other.

The imaging apparatus preferentially comprises a TEE probe being tracked by using electromagnetic based, optical shape sensing based or image based localization, in particular, the localization technique disclosed in the article "3D TEE Registration with X-ray Fluoroscopy for Interventional Cardiac Applications" by Ameet Jain et al., Lecture Notes in Computer Science, volume 5528, pages 321 to 329 (2009), which is herewith incorporated by reference.

The imaging apparatus can be adapted to allow a user to annotate a structure in the TEE volume rendering by indicating points, wherein depths information can be obtained from a z-buffer, and to select a graphical element by using the input unit. The graphical element can be matched to the selected points. In particular, the matching can be performed by using a least-squares method like the method disclosed in the article "Direct Least Square Fitting of Ellipses" by Andrew Fitzgibbon et al., IEEE Transactions on Pattern Analysis and Machine Intelligence, volume 21(5), pages 476 to 480 (1999), which is herewith incorporated by reference.

Using the information from the TEE probe tracking and geometry information of the catheterization laboratory like the source-to-image distance (SID), the projection direction, et cetera, the graphical element can be transformed to the space of the two-dimensional x-ray projection image and overlaid. In particular, the information from the TEE probe tracking and the geometry information of the catheterization laboratory can define the geometric relation between the first image and the second image, wherein this geometric relation can be used to transform a graphical element provided within a three-dimensional volume image acquired by the TEE probe to the two-dimensional x-ray projection image.

The imaging apparatus can also be adapted to generate graphical elements and annotations for the overlay automatically to reduce user interaction. For that purpose, the imaging apparatus can be adapted to use a heart model in which multiple cardiac structures are encoded. In addition, a graphical element and the name, i.e. the annotation, can be associated with one or several cardiac structures. The graphical element may be the cardiac structure itself or a graphical primitive like an ellipse with an element for indicating the rotational position of the ellipse that can be matched to the respective cardiac structure, for instance, via landmarks encoded in the heart model. The imaging apparatus can comprise a model adaptation unit for adapting the heart model to a three-dimensional TEE volume image using model based segmentation as disclosed, for instance, in the above mentioned article by O. Ecabert et al. The adapted heart model can be used to generate the respective annotation. The marker determination unit can subsequently determine parameters of the graphical element by matching the graphical element to landmarks, wherein an overlay can be generated by using TEE probe localization. This embodiment also allows displaying the names of anatomic structures automatically. In addition, the annotation may be generated for different heart phases using a temporal dependent spatially three-dimensional TEE volume image, i.e. using a three-dimensional TEE frame sequence for generating a continuous overlay.

The imaging apparatus can also be adapted to register a personalized heart model once to a two-dimensional x-ray projection image as currently done in the EP Navigator or the Heart Navigator. The personalized heart model can be generated from a three-dimensional computed tomography image or a three-dimensional magnetic resonance image by adapting a generic model like the model exemplarily and schematically shown in FIG. 4 to the three-dimensional computed tomography or the three-dimensional magnetic resonance image using model-based segmentation. To generate markers annotations, i.e. names of cardiac structures, at the later point in time, the personalized model can be matched rigidly to a three-dimensional TEE volume image. The transformation between the three-dimensional TEE volume image and a catheterization laboratory with corresponding x-ray projections can then be established via transformations, in particular, via rigid transformations, resulting from registering the personalized heart model to the two-dimensional x-ray projection image and the three-dimensional TEE volume image.

The imaging apparatus is preferentially adapted to be used in a catheterization laboratory system with integrated three-dimensional ultrasound imaging to support interventions such as mitral valve repair, atrial septal defect closure, et cetera.

Although in the above described embodiments the aortic valve is mentioned as a cardiac structure, for which markers are determined in the images, in other embodiments also other cardiac structures can be indicated by the markers in the images.

Although in the above described embodiments the object to be imaged is a heart of a living being, in other embodiments the object can also be another object like another organ or a technical object.

For visualizing the three-dimensional volume image on the display unit known visualization techniques for visualizing a three-dimensional object can be used like known surface rendering or volume rendering techniques. The three-dimensional volume image can also be shown slice by slice, wherein a user can scroll through the three-dimensional volume image. Within the three-dimensional volume image a user can arrange a graphical element by, for instance, using a corresponding graphical user interface providing, for example, a drag-and-drop procedure. In an embodiment the input unit of the imaging apparatus may also be adapted to allow a user to input points within the three-dimensional volume image, wherein the marker determination unit can be adapted to adapt a selected graphical element to the input points by using, for instance, a least-squares method. In particular, the input unit can be adapted to allow a user to input different kinds of points in the first image, wherein the different kinds of points correspond to different kinds of points of the graphical element and wherein the marker determination unit can be adapted to adapt the respective kind of points of the graphical element to the respective input points of the same kind.

Although in an above described embodiment the graphical element is a ring, in another embodiment the graphical element can also be another spatially two-dimensional or three-dimensional element like an ellipse.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like the determination of a geometric relation between images, the determination of corresponding marker locations and marker appearances, et cetera performed by one or several units or devices can be performed by any other number of units or devices. For example, steps 103 and 104 can be performed by a single unit or by any other number of different units. The determinations and/or the control of the imaging apparatus in accordance with the imaging method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an imaging apparatus for imaging an object. A geometric relation determination unit determines a geometric relation between first and second images of the object, wherein a marker determination unit determines corresponding marker locations in the first and second images and marker appearances based on the geometric relation such that the marker appearances of a first marker to be located at a first location in the first image and of a second marker to be located at a second corresponding location in the second image are indicative of the geometric relation. The images with the markers shown at the respective corresponding locations are shown on a display unit. Since the marker appearances are indicative of the geometric relation between the images, a comparative reviewing of the images can be facilitated, in particular, if they correspond to different viewing geometries.

The invention claimed is:

1. An imaging apparatus for imaging an object, the imaging apparatus comprising:
    a first imager configured to provide a first image of the object;
    a second imager configured to provide a second image of the object, wherein the first image and the second image have different viewing geometries; and
    a processor configured to:
        determine a geometric relation between the first image and the second image, and
        determine corresponding marker locations in the first and second images and marker appearances based on the geometric relation such that a first location in the first image and a second location in the second image show a same part of the object and such that the marker appearances of a first marker to be located at the first location and of a second marker to be located at the second location are indicative of the geometric relation between the first image and the second image; and
    a display configured to display the first image with the first marker at the first location and the second image with the second marker at the second location,
    wherein the first and second markers show the same part of the object in the first and second images, the first and second images being different images obtained from the first imager and the second imager which are different imagers.

2. The imaging apparatus as defined in claim 1, wherein the marker determination unit is adapted such that the first marker represents a spatially two-dimensional or three-dimensional graphical element in a first orientation within the first image, thereby defining the appearance of the first marker, and the second marker represents the spatially two-dimensional or three-dimensional graphical element in a second orientation within the second image, thereby defining the appearance of the second marker, wherein the first orientation and the second orientation of the spatially two-dimensional or three-dimensional graphical element differ from each other in accordance with the geometric relation between the first image and the second image such that the appearances of the first and second markers are indicative of the geometric relation between the first image and the second image.

3. The imaging apparatus as defined in claim 1, wherein the first image is an image acquired by a first imaging system and the second image is an image acquired by a second imaging system, wherein the imaging apparatus further comprises a localizer configured to localize the first imaging system with respect to the second imaging system, wherein the processor is further configured to calculate the geometric relation between the first image and the second image based on the localization of the first imaging system with respect to the second imaging system.

4. The imaging apparatus as defined in claim 3, wherein the localizer is one of an electromagnetic based, optical shape sensing based and image based localization unit.

5. The imaging apparatus as defined in claim 3, wherein one of the first imaging system and the second imaging system is a three-dimensional volume imaging system for acquiring a three-dimensional volume image and the other of the first imaging system and the second imaging system is a two-dimensional projection imaging system for acquiring a two-dimensional projection image, wherein the localizer is further configured to localize the three-dimensional volume imaging system with respect to the two-dimensional projection imaging system, and wherein the processor is further configured to determine the geometric relation between the three-dimensional volume image and the two-dimensional projection image based on the localization of the three-dimensional volume imaging system with respect to the two-dimensional projection imaging system.

6. The imaging apparatus as defined in claim 5, wherein the two-dimensional projection image is acquired in a projection acquisition geometry, wherein the processor is further configured to determine the geometric relation between the three-dimensional volume image and the two-dimensional projection image based on the localization of the first imaging system with respect to the second imaging system and the projection acquisition geometry.

7. The imaging apparatus as defined in claim 1, further comprising a user interface configured to allow a user to input the first location in the first image for providing the first location, wherein the processor is further configured to determine the second location in the second image based on the provided first location in the first image and the determined geometric relation between the first image and the second image.

8. The imaging apparatus as defined in claim 1, further comprising a user interface configured to allow a user to input a first marker to be located at the first location within the first image, wherein the processor is further configured to determine the second marker based on the input first marker and the determined geometric relation between the first image and the second image such that the marker appearance of the second marker with respect to the marker appearance of the first marker is indicative of the geometric relation between the first image and the second image.

9. The imaging apparatus as defined in claim 1, wherein the processor is further configured to:
provide an object model representing structures of the object,
assign to a structure a graphical element representing the structure, and
determine the first location of the first marker within the first image as being the location of the structure of the object model, wherein the graphical element assigned to the structure defines the marker appearance of the first marker, and
determine the second location and the marker appearance of the second marker by determining the location and orientation of the graphical element within the second image based on the geometric relation between the first image and the second image.

10. The imaging apparatus as defined in claim 9, wherein the processor is further configured to assign an annotation to structure to which the graphical element is assigned, wherein the display is further configured to display the graphical element and the annotation assigned to the structure.

11. The imaging apparatus as defined in claim 9, wherein the processor is further configured adapt the object model to the first image and to the second image, and determine the geometric relation based on the adaptations of the object model to the first image and to the second image.

12. The imaging apparatus as defined in claim 9, wherein the processor is further configured to adapt the object model to one of the first image and the second image and to rigidly adapt the adapted object model to the other of the first image and the second image, and determine the geometric relation based on the rigid adaptation of the adapted object model.

13. An imaging method for imaging an object, the imaging method comprising acts of:
providing a first image of the object by a first imager;
providing a second image of the object by a second imager, wherein the first image and the second image have different viewing geometries;
determining a geometric relation between the first image and the second image by a processor;
determining corresponding marker locations in the first and second images and marker appearances based on the geometric relation such that a first location in the first image and a second location in the second image show the same part of the object and such that the marker appearances of a first marker to be located at the first location and of a second marker to be located at the second location are indicative of the geometric relation between the first image and the second image, wherein the first and second markers show the same part of the object in the first and second images, the first and second images being different images obtained from the first and the second imager which are different imagers; and
displaying by a display the first image with the first marker at the first location and the second image with the second marker at the second location.

14. A non-transitory computer readable medium comprising computer instructions which, when executed by a processor, configure the processor to cause imaging an object by perform acts of:
causing a first imager to provide a first image of the object;
causing a first imager to provide a second image of the object, wherein the first image and the second image have different viewing geometries;
determining a geometric relation between the first image and the second image;
determining corresponding marker locations in the first and second images and marker appearances based on the geometric relation such that a first location in the first image and a second location in the second image show the same part of the object and such that the marker appearances of a first marker to be located at the first location and of a second marker to be located at the second location are indicative of the geometric relation between the first image and the second image, wherein the first and second markers show the same part of the object in the first and second images, the first and second images being different images obtained from the first imager and the second imager which are different imagers; and causing a display to display the first image with the first marker at the first location and the second image with the second marker at the second location.

15. The imaging apparatus of claim 1, and wherein the first image and the second image are taken at a same time by the different imagers.

16. The imaging method of claim 13, wherein the first image and the second image are taken at a same time by the different imagers.

17. The non-transitory computer readable medium of claim 14, wherein the first image and the second image are taken at a same time by the different imagers.

* * * * *